(12) United States Patent
Saito et al.

(10) Patent No.: US 8,844,602 B2
(45) Date of Patent: Sep. 30, 2014

(54) METHOD OF PROCESSING TERMINUS OF OPTICAL FIBER AND TERMINUS PROCESSING TOOL

(75) Inventors: Kazuhito Saito, Yokohama (JP); Wataru Sakurai, Yokohama (JP); Masaki Ohmura, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 32 days.

(21) Appl. No.: 13/130,341

(22) PCT Filed: Nov. 21, 2008

(86) PCT No.: PCT/JP2008/071193
§ 371 (c)(1),
(2), (4) Date: May 20, 2011

(87) PCT Pub. No.: WO2010/058475
PCT Pub. Date: May 27, 2010

(65) Prior Publication Data
US 2011/0220294 A1 Sep. 15, 2011

(51) Int. Cl.
*B32B 38/10* (2006.01)
*G02B 6/245* (2006.01)
*G02B 6/25* (2006.01)

(52) U.S. Cl.
CPC *G02B 6/25* (2013.01); *G02B 6/245* (2013.01); *Y10S 156/923* (2013.01); *Y10S 156/937* (2013.01)
USPC ........... 156/761; 156/701; 156/750; 156/923; 156/937; 81/9.4; 81/9.51; 81/9.41; 81/9.42; 81/9.43; 81/9.44

(58) Field of Classification Search
None
See application file for complete search history.

(56) References Cited

U.S. PATENT DOCUMENTS 3,621,560 A * 11/1971 Bright .............................. 29/828
5,140,751 A * 8/1992 Faust .............................. 30/91.1
5,269,206 A * 12/1993 Yagawa .......................... 81/9.51

(Continued)

FOREIGN PATENT DOCUMENTS

CN 1040054 C 9/1998
JP 40-015065 7/1965

(Continued)

OTHER PUBLICATIONS

Chinese Office Action of the corresponding Chinese Application No. 200880132019.4, dated Aug. 24, 2012.

(Continued)

*Primary Examiner* — Philip Tucker
*Assistant Examiner* — Nicholas Harm
(74) *Attorney, Agent, or Firm* — Global IP Counselors, LLP

(57) ABSTRACT

Provides a method and a terminus processing tool whereby terminus processing for the purpose of connection to another optical fiber may be carried out simply. The terminus processing method entails cutting an optical fiber 20 composed of a glass fiber 21 and a coating 24; and with the optical fiber 20 positioned relative to a terminus processing tool that is disposed contacting the coating at the end surface of the optical fiber 20 and that has a protruded-into space for accommodating inward protrusion of the glass fiber 21, and with the cut end surface of the glass fiber 21 facing the protruded-into space, pushing the optical fiber 20 to thereby strip the coating 24 from the glass fiber 21.

7 Claims, 7 Drawing Sheets

(56) References Cited

U.S. PATENT DOCUMENTS

| | | | |
|---|---|---|---|
| 5,298,105 A | | 3/1994 | Dorsey |
| 5,306,378 A | | 4/1994 | Takimoto et al. |
| 5,323,475 A | * | 6/1994 | Marsden et al. ............... 385/77 |
| 5,389,192 A | | 2/1995 | Takimoto et al. |
| 5,481,638 A | * | 1/1996 | Roll et al. .................... 385/134 |
| 5,604,834 A | * | 2/1997 | Beasley et al. ............... 385/114 |
| 5,819,602 A | * | 10/1998 | Brask et al. .................... 81/9.51 |
| 5,891,602 A | * | 4/1999 | Neumann ..................... 430/200 |
| 5,896,787 A | * | 4/1999 | DeVincentis .................. 81/9.51 |
| 6,247,481 B1 | * | 6/2001 | Meuris et al. ................. 134/133 |
| 6,549,712 B2 | * | 4/2003 | Abe et al. ..................... 385/123 |
| 6,708,857 B1 | * | 3/2004 | van Deursen et al. ............ 225/2 |
| 6,776,196 B2 | * | 8/2004 | Yamakawa .................. 140/71 R |
| 2002/0100552 A1 | * | 8/2002 | McLeod ....................... 156/344 |

FOREIGN PATENT DOCUMENTS

| | | |
|---|---|---|
| JP | 60-079306 A | 5/1985 |
| JP | 61-026010 A | 2/1986 |
| JP | 05-257041 A | 10/1993 |
| JP | 06-035624 | 9/1994 |
| JP | 2002-341148 A | 11/2002 |
| JP | 2003-167156 A | 6/2003 |
| JP | 2006-071923 A | 3/2006 |
| JP | 2008-292706 A | 4/2008 |
| TW | 363137 | 7/1999 |
| TW | 363137 | 9/1999 |
| TW | 200405052 A | 4/2004 |

OTHER PUBLICATIONS

The Written Opinion of the corresponding International Patent Application No. PCT/JP2008/071193.

Second Office Action of the corresponding Chinese Patent Application No. 200880132019.4, dated May 27, 2013.

Office Action of the Intellectual Property Office of the corresponding Taiwanese Patent Application No. 097145279, dated Nov. 26, 2013.

* cited by examiner

METHOD OF PROCESSING TERMINUS OF OPTICAL FIBER AND TERMINUS PROCESSING TOOL

TECHNICAL FIELD

The present invention relates to a method for stripping a coating from the terminus of an optical fiber composed of a glass fiber and a coating, and to a terminus processing tool used in the method.

BACKGROUND ART

When connecting an optical fiber composed of a glass fiber and a coating to another optical fiber, it is known to strip a prescribed length of the coating of the terminus in order to expose the glass fiber. The operation of stripping the coating is carried out using a mechanical stripper, for example (see Japanese Unexamined Patent Application 60-79306).

FIG. 7 is a perspective view showing a conventional stripper 100. The stripper 100 is composed of an upper member 101 and a lower member 102 that are pivoted at one edge. Clamps 105, 106 are respectively disposed within core guide portions 103, 104 which are provided to the upper member 101 and the lower member 102. A pair of core guide claws 107, 107 are disposed on the lower member 102, and slots (not shown in the drawing) that mate with the core guide claws 107 are provided in the upper member 101. Blades 108, 109 situated in opposition to one another are disposed on the upper member 101 and the lower member 102.

When the stopper 100 is used to strip the coating from an optical fiber, the optical fiber is guided by the core guide claws 107 and positioned at the location of the clamps 105, 106. In this state, the upper member 101 and the lower member 102 are urged into relative proximity with one another, whereby the blades 108, 109 slice into the coating that is to be stripped from the optical fiber, producing a cut. The coating is then stripped by moving the stripper 100 relative to the optical fiber.

According to this method, the coating is stripped by pressing the blades 108, 109 against the coating of the optical fiber, followed by relative motion of the stripper 100 towards the end of the optical fiber. For this reason, coating residue may be left adhering to the end of the optical fiber. Because cutting cannot be carried out in consistent fashion with coating residue adhering to the end of the optical fiber, it was necessary to either cut off the end or clean it with alcohol or the like, resulting in a complicated procedure.

Patent Citation 1: Japanese Unexamined Patent Application 60-79306

DISCLOSURE OF THE INVENTION

Technical Problems

It is an object of the present invention to provide a method whereby terminus processing for the purpose of connection to another optical fiber may be carried out straightforwardly, as well as a terminus processing tool for use in the method.

Means Used to Solve the Above-Mentioned Problems

The method of processing a terminus of an optical fiber according to the present invention includes: (1) cutting an optical fiber composed of a glass fiber and a coating; and (2) pushing the optical fiber against a terminus processing tool and thereby removing the coating from the glass fiber, the terminus processing tool being adapted to contact the coating at an end surface of the optical fiber, and having a space into which the glass fiber is inserting; and the coating being removed in a state wherein the cut end of the optical fiber is inserted-into the space.

Optionally, the space to which the glass fiber is inserting is a hole with diameter larger than an outside diameter of the glass fiber and smaller than an outside diameter of the coating. In this case, it is preferable for the inside distal end portion of the hole to be chamfered. Where the coating is composed of two or more layers, it is preferable for the inside distal end diameter of the hole to be smaller than the outside diameter of the coating of the innermost layer of the coating of two or more layers. Additionally, it is preferable for the inside diameter of the hole to be progressively smaller in a direction in which the optical fiber is inserted.

In preferred practice, an initial flaw is formed, between the cutting step and the stripping step, in the outside peripheral portion of the coating. In this case, optionally, a plurality of initial flaws are formed in the circumferential direction on an outside peripheral face of the coating.

Optionally, the space is a concave portion with diameter larger than the outside diameter of the glass fiber and smaller than the outside diameter of the coating.

The terminus processing tool according to the present invention is adapted to contact a coating at an end surface of an optical fiber composed of a glass fiber and the coating, and having a space into which the glass fiber is inserting.

Advantageous Effect of the Invention

According to the present invention, it is possible to prevent coating residue from adhering to the end surface of a glass fiber when the coating is stripped by blades traveling towards the end of the optical fiber as practiced in the prior art, thereby obviating the need for a cleaning procedure in a step subsequent to stripping the coating. Consequently, terminus processing for the purpose of connection to another optical fiber may be carried out straightforwardly.

DETAILED DESCRIPTION OF THE INVENTION

Figure 1:
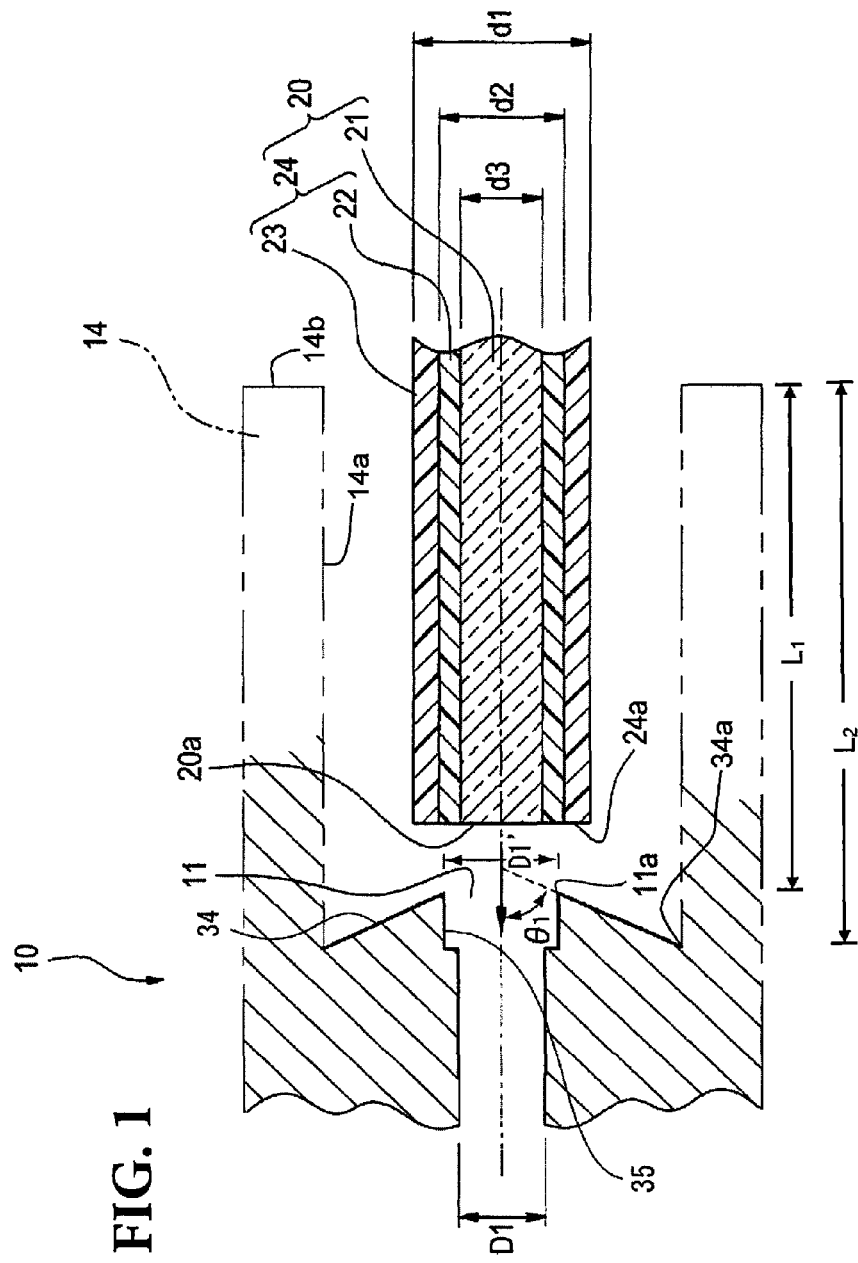
FIG. 1 is a cross sectional view showing part of an optical fiber terminus processing tool according to a first embodiment of the invention, together with the optical fiber being processed.

The embodiments of the present invention are described below with reference to the drawings. The drawings are intended for illustrative purposes, and are not limiting of the invention. In the drawings, in order to avoid redundant description, like symbols indicate like components. Dimensional proportions in the drawings are not necessarily accurate.

FIG. 1 is a cross sectional view showing part of an optical fiber terminus processing tool 10 according to a first embodiment of the invention, together with an optical fiber 20 being processed. The processing tool 10 includes a cylindrically shaped outer wall 14, a conically shaped wall 34 with a recessed portion 35. An aperture or gap 11 extends through the processing tool 10 and the recessed portion 35. The gap 11 has a diameter D1 and the recessed portion 35 has an inner diameter D1' that is larger than the diameter D1. In the terminus processing method using the terminus processing tool 10, first, the optical fiber 20, which is composed of a glass fiber 21 and a coating 24, is cut with the coating 24 still attached. Next, the end surface 24a of the coating 24 at the cut end surface 20a of the optical fiber 20 is pressed against the terminus processing tool 10. By so doing, the coating 24 is peeled and stripped from the glass fiber 21.

The optical fiber 20 has an overall outside diameter d1. The coating 24 includes a first coating layer 22 with an outer diameter d2, and a second coating layer 23. The glass fiber 21 has an outer diameter d3. In the optical fiber 20, the outside diameter d3 of the glass fiber 21 is, e.g., 125 μm; and the outside diameter d1 of the coating 24 is, e.g., 250 μm. The glass fiber 21 is a glass fiber having a core and one or more cladding layers, and it is also possible to employ glass fibers of any refractive index distribution, such as single mode fibers or multi-mode fibers.

The first coating layer 22 of the coating 24 contacts the glass fiber 21, and the second coating layer 23 serves as a sheath covering the exterior of first coating layer 22; however, the coating 24 is not limited to this arrangement, and configurations having a single layer or more than two layers are also possible. A tinted layer may be provided as the outermost layer. The resin constituting the coating 24 is a UV curing type resin such as urethane acrylate, and using additives is imparted with properties such as appropriate elasticity. For example, the first coating layer 22 which contacts the glass fiber 21 has lower elasticity (i.e., softness) than the second coating layer 23.

The terminus processing tool 10 is adapted to contact the end surface 24a of the coating 24. The gap 11 serves as a space for accommodating inward protrusion of the glass fiber 21 when the optical fiber 20 is pressed against the conically shaped wall 34 within the outer wall 14 of the terminus processing tool 10. By forming an outer wall 14 of round tubular shape at the end of the terminus processing tool 10, it is possible to support the optical fiber 20 during insertion, thereby minimizing the likelihood of buckling when the optical fiber 20 is inserted into the gap 11, to afford insertion of the optical fiber 20 into the gap 11 in an easy and reliable manner. The outer wall 14 defines a hollow space that includes an inner surface 14a and a fiber entering end 14b that is contiguous with the inner surface 14a. The conically shaped wall 34 is located within the hollow space facing a portion of the inner surface 14a and includes a large diameter end 34a and a small diameter end 11a (also referred to as a distal end portion 11a).

The conically shaped wall 34 has a truncated conically shaped surface located entirely within the hollow space defined within the outer wall 14. The conically shaped wall 34 further defines the hollow space. The conically shaped wall 34 and the inner surface 14a are continuous with one another (uninterrupted). The small diameter end 11a is closer to the fiber entering end 14b of the outer wall 14 than the large diameter end 34a. More specifically, the small diameter end 11a is spaced apart from the fiber entering end 14b of the end wall 14 by a distance $L_1$. The large diameter end 34a of the conically shaped wall 34 intersects the inner surface 14a of the outer wall 14 at a location that is spaced apart from the fiber entering end 14b of the outer wall 14 by a distance $L_2$ measured parallel to the distance $L_1$. The distance $L_2$ is greater than $L_1$. Further, the outer wall 14 and the conically shaped wall 34 are fixed to one another. For example, the outer wall 14 and the conically shaped wall 34 can be unitarily formed as a single, monolithic element.

It is possible, for example, for the gap 11 to be a circular gap, a square gap, or a regular polygon shaped gap, or a gap having serrated contours at its perimeter; here, a circular gap is described as a preferred example. With a circular gap, forces tend to act uniformly in the circumferential direction of the optical fiber 20. It is good for stripping of the coating. The inside diameter D1 of the gap 11 is larger than the outside diameter d3 of the glass fiber 21, and smaller than the outside diameter d1 of the coating 24 (i.e., the outside diameter of the optical fiber 20). When the end surface 20a of the optical fiber 20 is pressed against the conically shaped wall 34 with the glass fiber 21 aligned with the recessed portion 35 (the perimeter of the gap 11 of the terminus processing tool 10), the distal end portion 11a of the recessed portion contacts the end surface 24a of the coating 24, but does not contact the glass fiber 21.

Preferably, the inside diameter D1' of the recessed portion 35 at the distal end portion 11a of the gap 11 is smaller than the outside diameter d2 of the first coating layer 22 that makes up the coating 24. Further, the inside diameter D1' is greater than the outside diameter d3 of the glass fiber 21. Consequently, the distal end portion 11a serves as a coating removing edge. When the optical fiber 20 is pressed against the distal end portion 11a of the terminus processing tool 10, force can act directly on the first coating layer 22, and the coating 24 can be completely stripped from the glass fiber 21 due to the coating removing edge (the distal end portion 11a of the gap 11). Further, a taper angle $\theta_1$ of the conically shaped wall 34 at the distal end portion 11a (the angle to the center axis of the gap 11) is preferably from 30° to 90°. The coating 24 can be easily peeled away from the glass fiber 21 towards the outer wall 14.

Figure 2A:
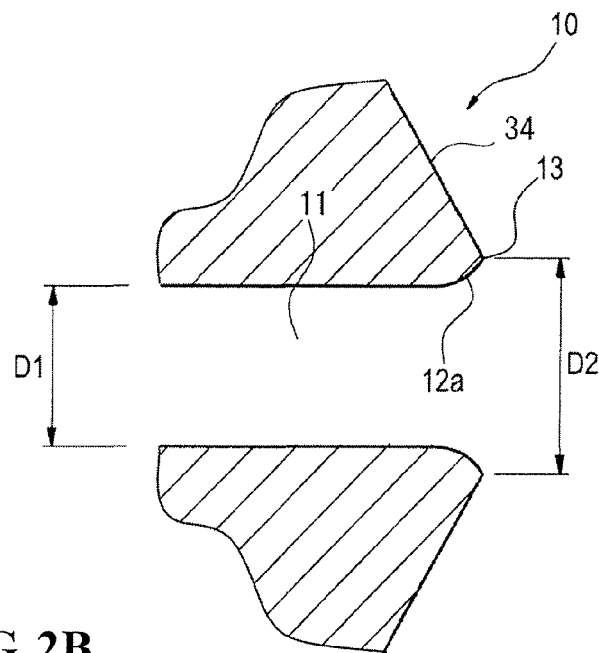
In FIG. 2, area (A) and area (B) are respectively enlarged fragmentary views showing the distal end portion of a hole in the terminus processing tool of the first embodiment.
Figure 2B:
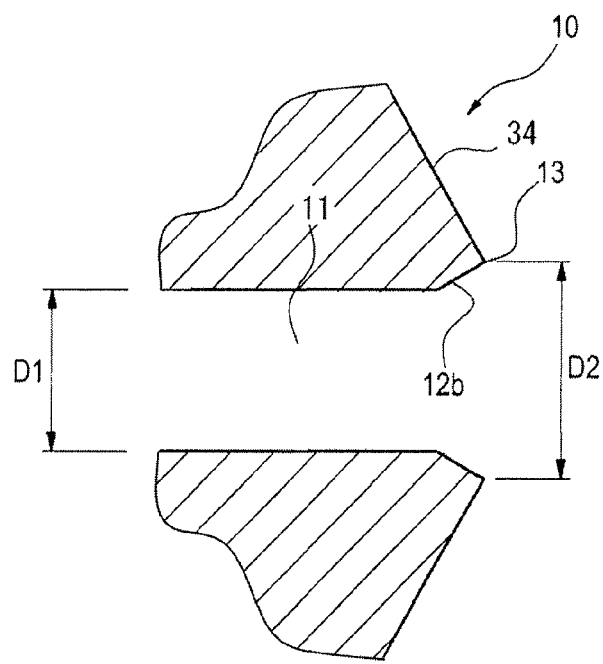

In FIG. 2A and FIG. 2B are enlarged fragmentary views showing the distal end portion of the gap 11 in the terminus processing tool 10. In preferred practice, the inside distal end portion 11a of the gap 11 is chamfered, instead of including the recessed portion 35 shown in FIG. 1. For example, a chamfer having an arcuate curving face (rounded chamfer 12a) as shown in FIG. 2A may be provided. Alternatively, a chamfer having a linear flat face (45° chamfer 12b) as shown in FIG. 2B may be provided. This makes it easy to insert the optical fiber 20 into the gap 11 of the terminus processing tool 10. The inside diameter D2 of a large-diameter end 13 of the chamfer 12 at the distal end of the gap 11 is smaller than the outside diameter d2 of the first coating layer 22 that makes up the coating 24, and greater than the outside diameter d3 of the glass fiber 21. The large-diameter end 13 defines a coating removing edge.

Figure 3A:
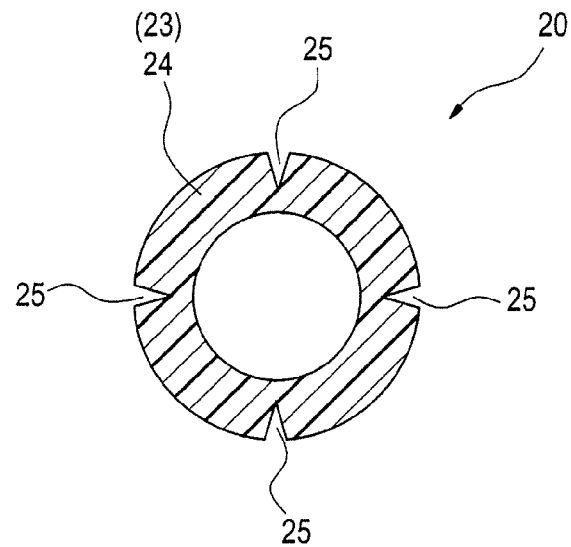
In FIG. 3, area (A) is a cross sectional view of an optical fiber provided with initial flaws in the coating, and area (B) is a front view thereof.
Figure 3B:
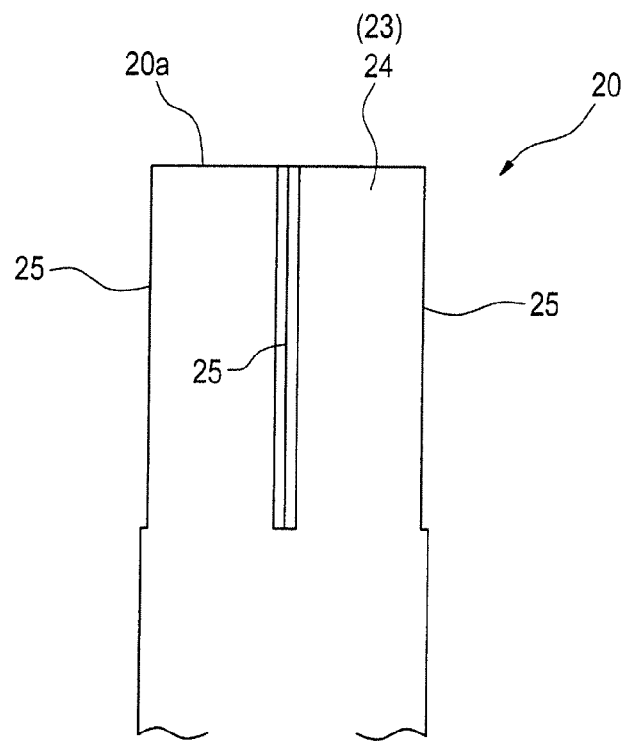

FIG. 3A is a cross sectional view of an optical fiber 20 provided with initial flaws in the coating, and FIG. 3B is a front view thereof. In preferred practice, the outside peripheral portion at the distal end of the coating 24 is provided with initial flaws 25. The initial flaws 25 may be formed in the coating 24 beforehand, or formed during the terminus processing step. Preferably, the initial flaws 25 are disposed at multiple equidistant locations (four are shown in FIG. 3) on the outside peripheral face of the coating 24 and are provided with prescribed length which is shorter than the terminus processing length in the axial direction (about 0.5 to 1 mm, for example). The initial flaws 25 may be given a "V" shaped cross section, for example, or may be provided by simple cuts. This facilitates outward peeling of the coating 24, whereby the coating 24 may be easily stripped.

Figure 4A:
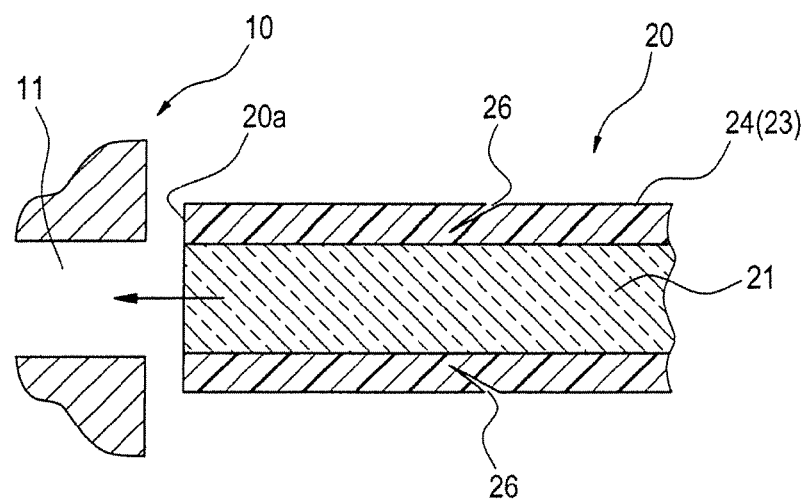
FIG. 4 is a drawing illustrating terminus processing of an optical fiber provided with initial flaws in the coating, wherein area (A) is a cross sectional view of the optical fiber prior to processing, and area (B) is a cross sectional view of the optical fiber subsequent to processing.
Figure 4B:
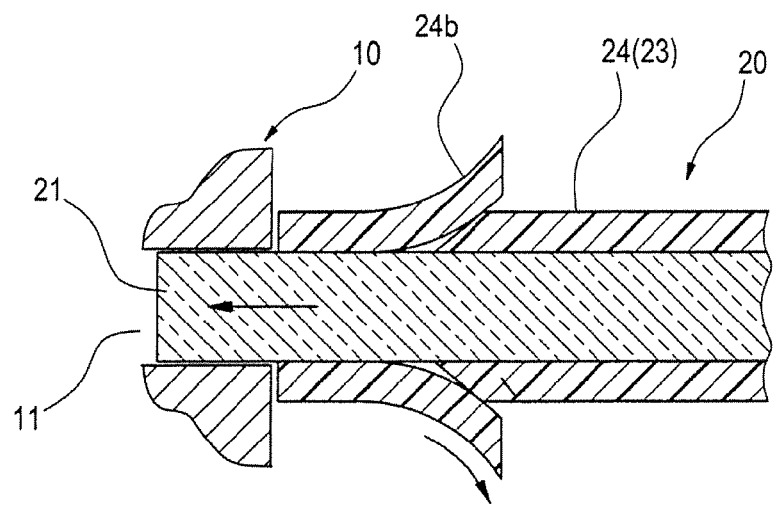

FIGS. 4A and 4B are drawings illustrating terminus processing of the optical fiber 20 provided with initial flaws in the coating, wherein FIG. 4A is a cross sectional view of the optical fiber prior to processing. An initial flaw 26 that is continuous in the circumferential direction of the optical fiber 20 may be disposed at a location a prescribed distance from the end surface 20a of the optical fiber 20, for example, one equal to the terminus processing length. Optionally, the initial flaw 26 is a cut that slices inward towards the end of the optical fiber 20. FIG. 4B is a cross sectional view of the optical fiber subsequent to processing. When the optical fiber 20 is pressed against the gap 11 of the terminus processing tool 10, the coating 24b at the end is pressed in the rightward direction in the drawing and spreads outwardly along the initial flaw 26, whereby the coating 24b can be easily stripped. Moreover, by setting the location of the initial flaw 26 to one equal to the terminus processing length from the end surface 20a, the desired length of the coating 24 can be stripped.

Figure 5:
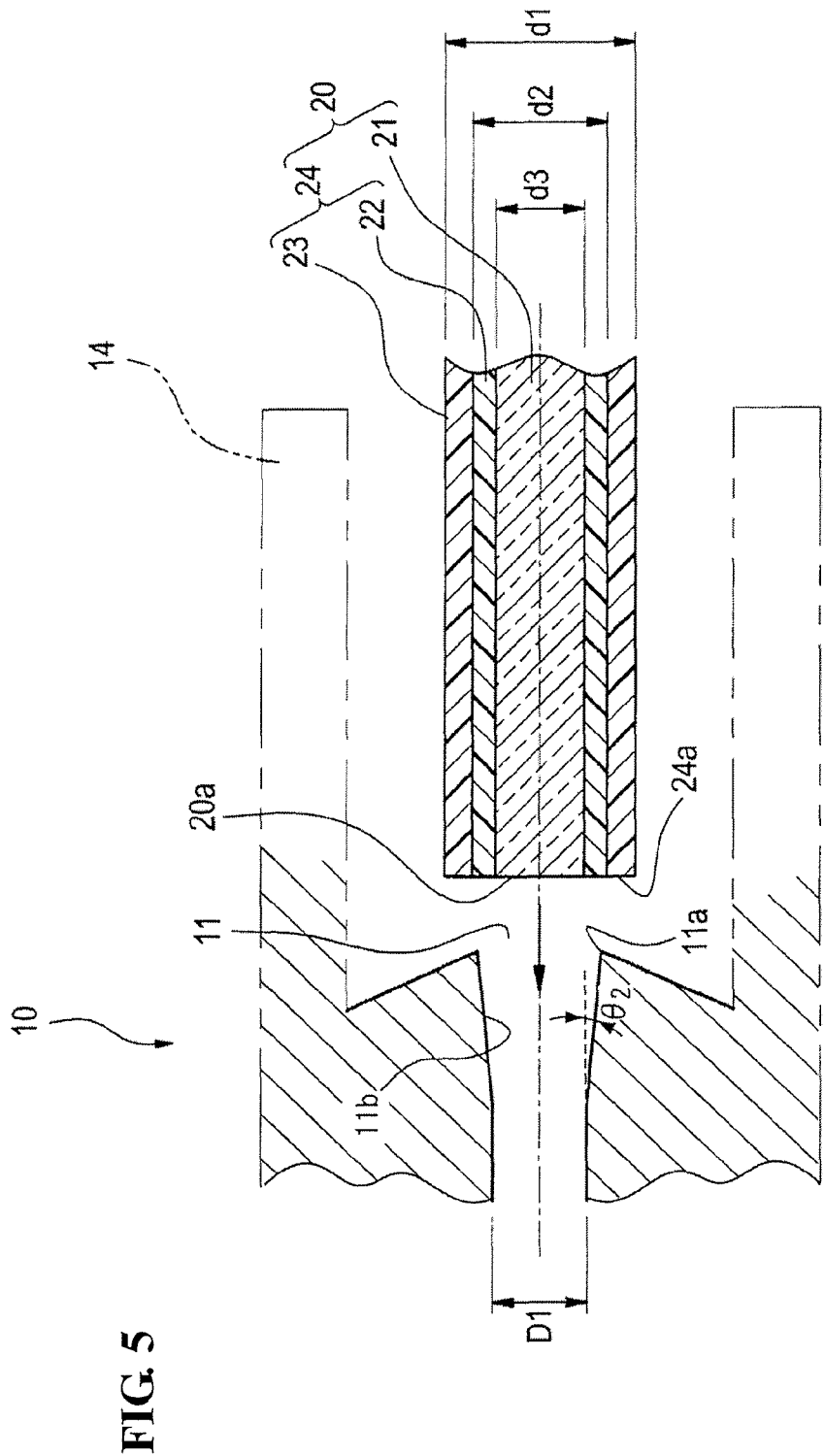
FIG. 5 is a cross sectional view showing a modification of the terminus processing tool of the first embodiment.

FIG. 5 is a cross sectional view showing a modification of the terminus processing tool of the first embodiment. The gap 11 is provided with a tapered portion 11b of progressively smaller inside diameter towards the inside from the distal end surface of the terminus processing tool 10. The inside diameter of the tapered portion 11b at the distal end portion 11a is smaller than the outside diameter d1 of the optical fiber 20 and larger than the outside diameter d3 of the glass fiber 21 of the optical fiber 20. Also, it is preferable for the inside diameter at the distal end portion 11a to be smaller than d2, so that the distal end portion 11a contacts the first coating layer 22. The taper angle of the tapered portion 11b (the angle to the center axis of the gap 11) $\theta_2$ is preferably from 0° to 30°.

When the optical fiber 20 is pressed against the terminus processing tool 10, the end surface 24a of the coating 24 contacts the distal end portion 11a, the coating 24 peels away from the glass fiber 21, and the tip of the glass fiber 21 pushes into the gap 11. Because the optical fiber 20 is inserted along the tapered portion 11b, positioning of the distal end of the optical fiber 20 can be carried out with high accuracy.

According to the optical fiber terminus processing method and terminus processing tool 10 described above, it is possible to prevent coating residue from adhering to the end surface of the glass fiber 21 when the coating 24 is stripped by blades traveling towards the end of the optical fiber 20 as practiced in the prior art, thereby obviating the need for a cleaning procedure in a step subsequent to stripping the coating 24. Consequently, terminus processing for the purpose of connection to another optical fiber may be carried out straightforwardly. The material of the terminus processing tool 10 is preferably a ceramic such as zirconia, or a resin material such as an epoxy resin or polyphenylene sulfide resin.

Figure 6A:
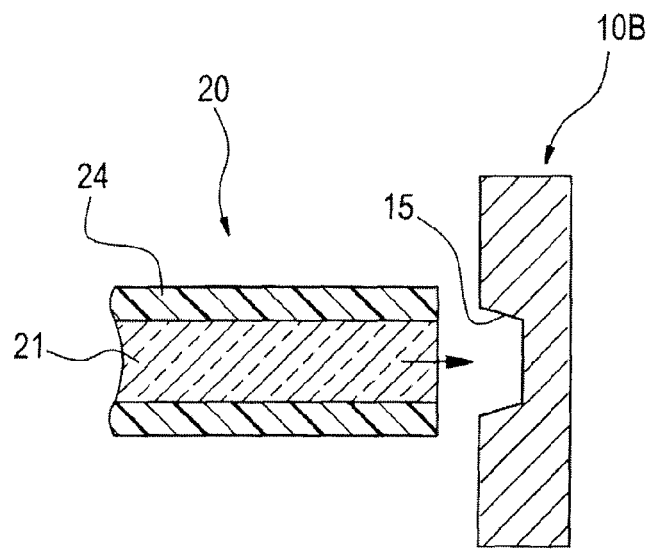
FIG. 6 is cross sectional view showing part of an optical fiber terminus processing tool according to a second embodiment of the invention, together with the optical fiber being processed, wherein area (A) shows the state prior to processing, and area (B) shows the state subsequent to processing.
Figure 6B:
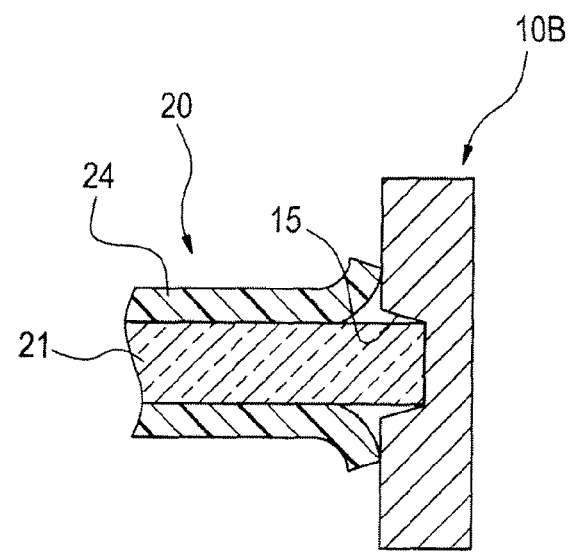
Figure 7:
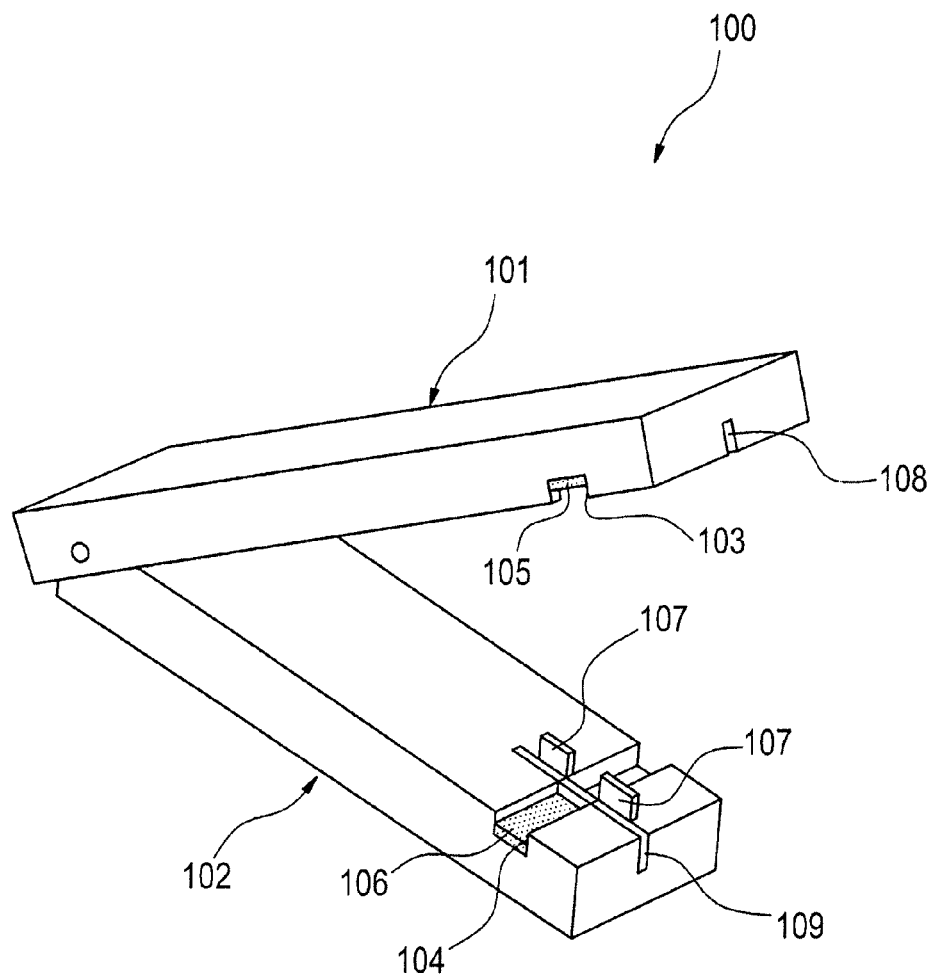
FIG. 7 is a perspective view showing a conventional optical fiber coating stripping device (stripper).

FIGS. 6A and 6B are cross sectional views showing part of an optical fiber terminus processing tool 10B according to a second embodiment of the invention, together with the optical fiber being processed, wherein FIG. 6A shows the state prior to processing. The terminus processing tool 10B has a concave portion 15 of inside diameter larger than the outside diameter d3 of the glass fiber 21 of the optical fiber 20, and smaller than the outside diameter d1 of the optical fiber 20. FIG. 6B shows the state subsequent to processing. When the end surface of the optical fiber 20 is pressed against the concave portion 15 of the terminus processing tool 10B, the distal end of the coating 24 peels away outwardly, and the tip of the glass fiber 21 protrudes from the coating 24 and is enclosed within the concave portion 15.

The present application claims priority on the basis of a Japanese Patent Application (Japanese Unexamined Patent Application 2007-137171) applied for on 23 May 2007, the content of which is incorporated herein by reference.

INDUSTRIAL APPLICABILITY

The invention is useful as a terminus processing method and a processing tool prior to securing an optical fiber to an optical connector.

What is claimed is:

1. A terminus processing tool adapted to contact a coating at an end surface of an optical fiber composed of a glass fiber and the coating, the terminus processing tool comprising:
    an outer wall that includes a fiber entering end and an inner surface that defines a hollow space, the inner surface surrounding the hollow space, the fiber entering end having an opening that is open to the hollow space, the outer wall being dimensioned to surround the optical fiber when the optical fiber is inserted into the hollow space of the terminus processing tool via the opening at the fiber entering end; and
    an end wall having a truncated conically shaped surface further defining the hollow space, the outer wall and the end wall being continuous, the truncated conically shaped surface facing the inner surface, the truncated conically shaped surface having a bottom end and a top end, the bottom end having a first diameter and the top end having a second diameter that is smaller than the first diameter, the bottom end being spaced apart from the fiber entering end of the outer wall by a first distance, the top end being spaced apart from the fiber entering end of the outer wall by a second distance that is less than the first distance, the bottom end of the truncated conically shaped surface intersecting with the inner surface at a location spaced apart from the fiber entering end by the first distance, both the first distance and the second distance being measured parallel to the inner surface, the truncated conically shaped surface having a coating removing edge formed at the top end around a hole in the truncated conically shaped surface into whose interior the glass fiber protrudes as the coating is removed from the glass fiber, and from the bottom end toward the top end thereof the truncated conically shaped surface further extends away from the inner surface of the outer wall.

2. The terminus processing tool according to claim 1, wherein
    the inner surface of the outer wall has a cylindrical shape with an inner diameter that is larger than an outer diameter of the optical fiber, and the hole has an inner diameter that is smaller than the outer diameter of the glass fiber and smaller than an outer diameter of the coating.

3. The terminus processing tool according to claim 1, wherein the hole includes a chamfered area adjacent to the coating removing edge.

4. The terminus processing tool according to claim 3, wherein the outer wall and the end wall are unitarily formed as a single monolithic element.

5. The terminus processing tool according to claim 1, wherein the coating of the optical fiber includes an inner layer and an outer layer, and the hole at the top end of the truncated conically shaped surface has an inner diameter that is smaller than an outside diameter of the outer layer of the coating.

6. The terminus processing tool according to claim 1, wherein the hole at the top end of the truncated conically shaped surface has an inner diameter at the coating removing edge and a tapering inner diameter that becomes progressively smaller in a direction extending into the hole and away from the coating removing edge.

7. A terminus processing tool adapted to contact a coating at an end surface of an optical fiber composed of a glass fiber and the coating, the terminus processing tool comprising:

an outer wall that includes a fiber entering end and an inner surface that defines a hollow space, the inner surface surrounding the hollow space, the fiber entering end having an opening that is open to the hollow space, the outer wall being dimensioned to surround the optical fiber when the optical fiber is inserted into the hollow space of the terminus processing tool via the opening at the fiber entering end; and an end wall having a truncated conically shaped surface located entirely within the hollow space, the truncated conically shaped surface facing the inner surface, the truncated conically shaped surface having a bottom end and a top end, the bottom end having a first diameter and the top end having a second diameter that is smaller than the first diameter, the bottom end being spaced apart from the fiber entering end of the outer wall by a first distance, the top end being spaced apart from the fiber entering end of the outer wall by a second distance that is less than the first distance, the bottom end of the truncated conically shaped surface intersecting with the inner surface at a location spaced apart from the fiber entering end by the first distance, both the first distance and the second distance being measured parallel to the inner surface, the truncated conically shaped surface having a coating removing edge formed at the top end around a hole in the truncated conically shaped surface into whose interior the glass fiber protrudes as the coating is removed from the glass fiber, the outer wall and the end wall being unitarily formed as a single monolithic element.

* * * * *